(12) United States Patent
Monahan et al.

(10) Patent No.: US 9,718,730 B1
(45) Date of Patent: Aug. 1, 2017

(54) REINFORCING FIBER AND MATERIAL FORMED THEREWITH

(71) Applicants: Jon E. Monahan, Arcola, IL (US); Thomas F. Monahan, Arcola, IL (US)

(72) Inventors: Jon E. Monahan, Arcola, IL (US); Thomas F. Monahan, Arcola, IL (US)

(73) Assignee: THE THOMAS MONAHAN CO., Arcola, IL (US)

( * ) Notice: Subject to any disclaimer, the term of this patent is extended or adjusted under 35 U.S.C. 154(b) by 0 days.

(21) Appl. No.: 15/009,925

(22) Filed: Jan. 29, 2016

(51) Int. Cl.
*C04B 24/26* (2006.01)
*C04B 16/06* (2006.01)
*D01F 6/06* (2006.01)
*D02G 3/44* (2006.01)
*D02G 3/34* (2006.01)

(52) U.S. Cl.
CPC ........ *C04B 16/0633* (2013.01); *C04B 16/065* (2013.01); *C04B 16/0616* (2013.01); *C04B 16/0625* (2013.01); *C04B 16/0683* (2013.01); *C04B 16/0691* (2013.01); *D01F 6/06* (2013.01); *D02G 3/34* (2013.01); *D02G 3/447* (2013.01); *D10B 2321/022* (2013.01); *D10B 2505/02* (2013.01)

(58) Field of Classification Search
CPC ............ C04B 16/0633; C04B 16/0616; C04B 16/0691; C04B 16/0683; C04B 16/0625; C04B 16/065; D02G 3/447; D02G 3/34; D01F 6/06; D10B 2505/02; D10B 2321/022
USPC ............................................................ 524/5
See application file for complete search history.

(56) References Cited

U.S. PATENT DOCUMENTS 3,237,776 A * 3/1966 Painter, Jr. ............. B01D 39/08
                                                          210/503
3,287,784 A * 11/1966 Loftin ................... A24D 3/0204
                                                          19/0.46
6,177,195 B1 * 1/2001 Yabuki ................ C04B 16/0633
                                                          428/357

OTHER PUBLICATIONS

Bentur et al., Cement and Concrete Research, 27(7), 1099-1111, 1997.*

* cited by examiner

*Primary Examiner* — Hui Chin
(74) *Attorney, Agent, or Firm* — R. William Graham (57) ABSTRACT

A reinforcing fiber and reinforced material, which includes a fiber having a first radical wave therein, wherein said first radical wave includes an amplitude of between about 0.5 to 1 cm and a wave run width of about 0.05 to about 0.3 cm, and a leading run and trailing run of at least about 0.75.

8 Claims, 7 Drawing Sheets

| Radical Wave Type | Photo |
|---|---|
| #2 | |
| #3 | |
| #4 | |

REINFORCING FIBER AND MATERIAL FORMED THEREWITH

BACKGROUND OF THE INVENTION

Field of Invention

The invention relates to a reinforcing fibers for use in concrete. Particularly, the invention relates to improvements in concrete through use of the specific geometric reinforcing fiber.

Prior Art

There are various wire designs for mixing in concrete material. Such wire designs are for the reinforcement of synthetic resins, plastics, rubber and other materials, especially mortar and concrete, which only offer a small resistance to a tensile force. These typically employ pieces of wire, made of steel, glass fiber or another synthetic material of high tensile strength which, when mixed up in a material with enhanced strength.

In order to improve the strength characteristics for a given weight of wire material, it has been previously proposed to increase the concentration of wires in the mass by a greater subdivision of finer wires. Various length and diameter ratios have been tried to enhance grip of the wire on the material. In addition, corrugations, helicoidal or ring shaped wires have been tried to improve strength and hold.

The prior use of polymeric fibers (especially polypropylene) has to date remained limited to control of plastic shrinkage cracking in freshly placed concrete resulting from loss of mix and bleed water through evaporation. Given their non structural purpose, the volume fractions of fibers used in these applications have also remained low (approximately 0.1%). The load carrying capacity of plain concrete without fiber reinforcement or that of concrete carrying a minimal amount of polypropylene fiber reinforcement (approximately 0.1% by volume) beyond matrix cracking is essentially zero. There have been some attempts to introduce greater volume fractions (about 1%) of larger diameter polypropylene fiber into concrete. These fibers have brought polymeric materials into the category of "structural" fibers Where the purpose is not so much to control plastic shrinkage cracking, but also to improve the toughness, energy absorption capability and the load carrying capacity of concrete beyond first matrix cracking.

The prior "structural" polypropylene fibers develop a poor bond with the surrounding matrix and are not very efficient. What is not known to-date, however, is what constitutes an optimal deformation for a low modulus material as polypropylene. One attempt used a sinusoidally configured fibers for reinforcing concrete and like materials.

One of the complications in adding such wires is the inability to mix these in a manner which disperses them to a degree which meet the goals of enhanced strength. If the wires for fibers tend to cluster then there is created a weak spot in the resultant material. There is a continued need to find the best geometric solution and composition for enhancing the strength such materials.

The instant invention is believed to address the needs of finding and improved a geometric design for a fiber which also meets acceptable new mix-ability.

SUMMARY OF THE INVENTION

It is an object of the present invention to provide and improved geometric fiber design for use in enhancing material strength.

Another object invention, is to provide a fiber of a geometric design which lends itself to greater mix-ability.

Accordingly, the invention is directed to an improved fiber for reinforcing construction materials. The fiber preferably is made of a polymer having a wave therein, wherein the wave includes an amplitude of between about 0.5 to 1 cm and a wave run width of about 0.05 to about 0.3 cm, a leading run and trailing run of at least about 0.75 to about 1 cm long. A preferred fiber length is about 5 cm. In a preferred embodiment, the wave includes a leading edge and a trailing edge which are generally normal to the leading and trailing run and form part of generally square wave. A preferred fiber cross-sectional width can preferably be between 0.2 to 0.3 cm. and a linear density between about 2500 to 4500 Denier. Additionally, another aspect of the invention is to provide the fibers in a manner to interconnect the same.

By using the above fiber structure, there is provided an improved fiber which is exceptional for increased strength as well as mix-ability. Various objects, features and advantages will clearly appear from the detailed description given below taken in connection with the accompanying drawings which form part of this specification and illustrate merely by way of examples embodiments of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings in which:

DETAILED DESCRIPTION OF PREFERRED EMBODIMENTS

Referring now to the drawings, the reinforcing fiber of the instant invention is generally designated by the numeral 100. The term "reinforcing" as used herein refers to a fiber with increased strength as well as mix-ability. The reinforcing fiber 100 preferably is made of a polymer having a wave 102 therein. The wave 102 includes an amplitude A of between about 0.5 to 1 cm and a wave width W of about 0.05 to about 0.3 cm, a leading run LR and trailing run TR of at least about 0.75 to about 1 cm long. A preferred length of fiber 100 is about 5 cm with distance between two peaks of radical waves 102 separated by at least about 1.5 to 3 cm, and preferably 3.

Figure 1A:
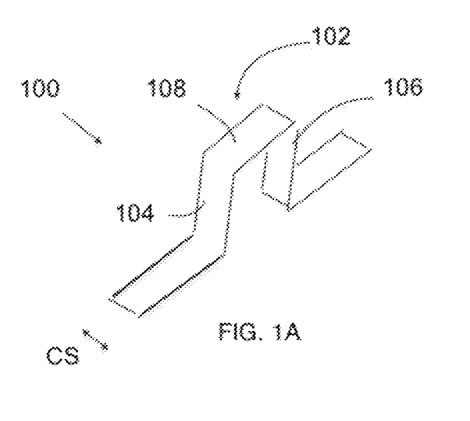
FIG. 1A is a perspective illustration of a reinforcing fiber geometry according to the invention.
Figure 1B:
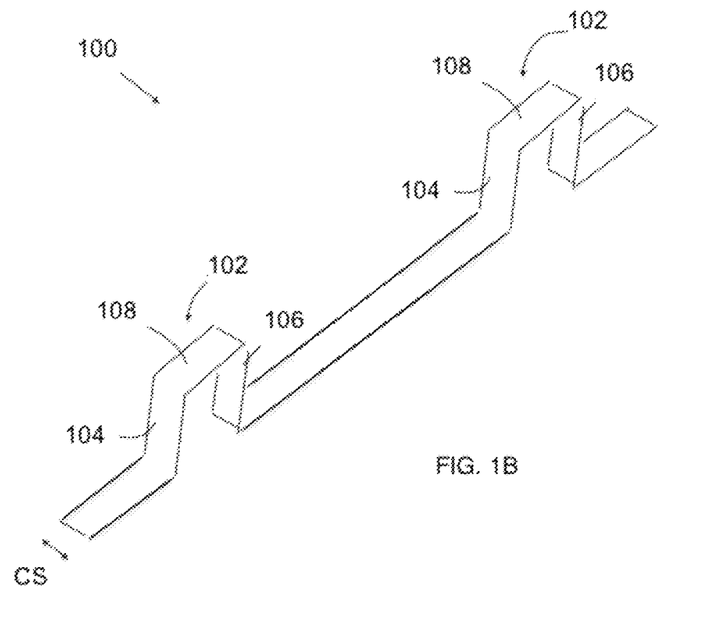
FIG. 1B is a perspective illustration of another embodiment of reinforcing fiber geometry according to the invention.
Figure 2:
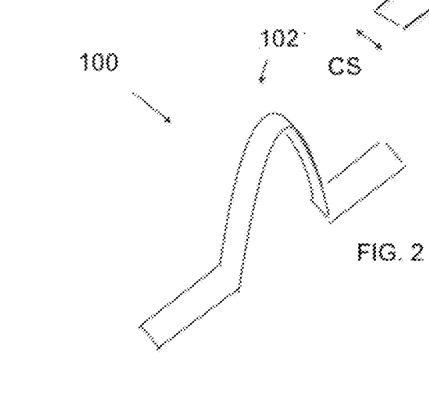
FIG. 2 illustrates another aspect of a reinforcing fiber according to the invention.

In a preferred embodiment, the wave 102 includes a leading edge 104 and a trailing edge 106 which are generally normal to the leading run LR and trailing run TR and and include a peak run 108 form part of generally square wave. This is represented in FIG. 1A and FIG. 1B. A preferred fiber cross-sectional width CS can preferably be between 0.2 to 0.3 cm. and a linear density between about 2500 to 4500 Denier.

Figure 4:
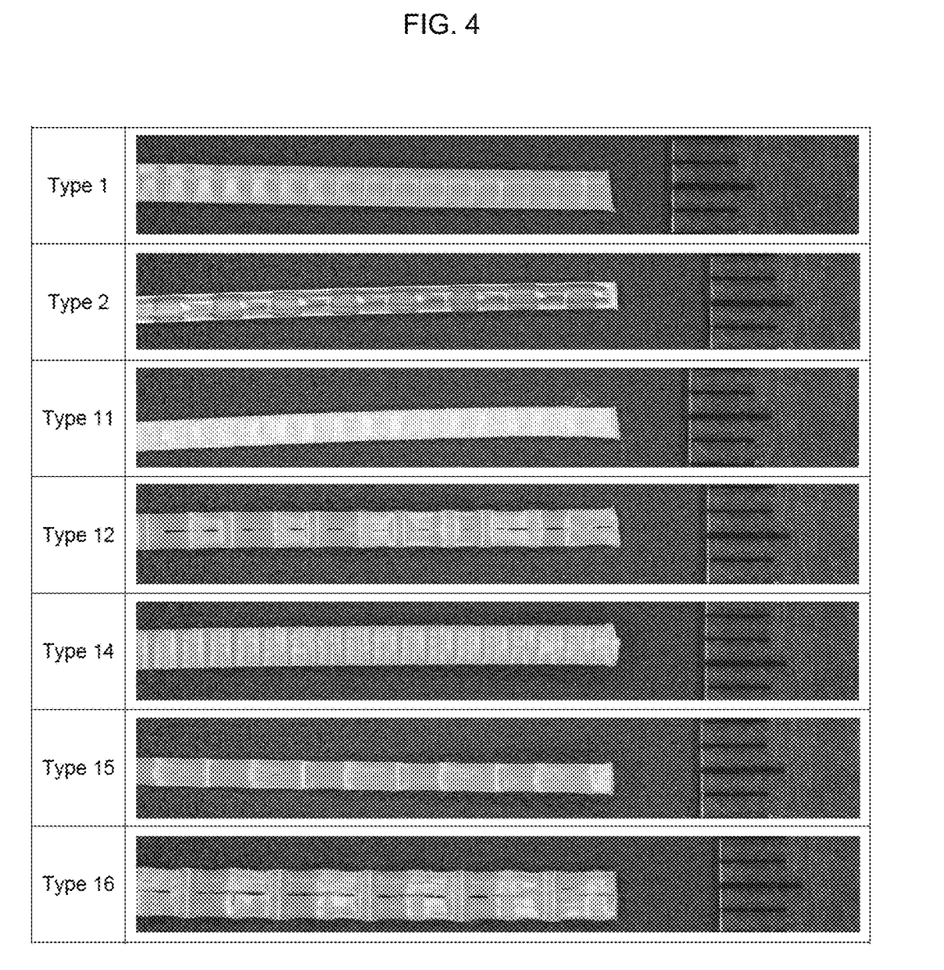
FIG. 4 shows a top view comparative example of fibers tested according to the invention.
Figure 5:
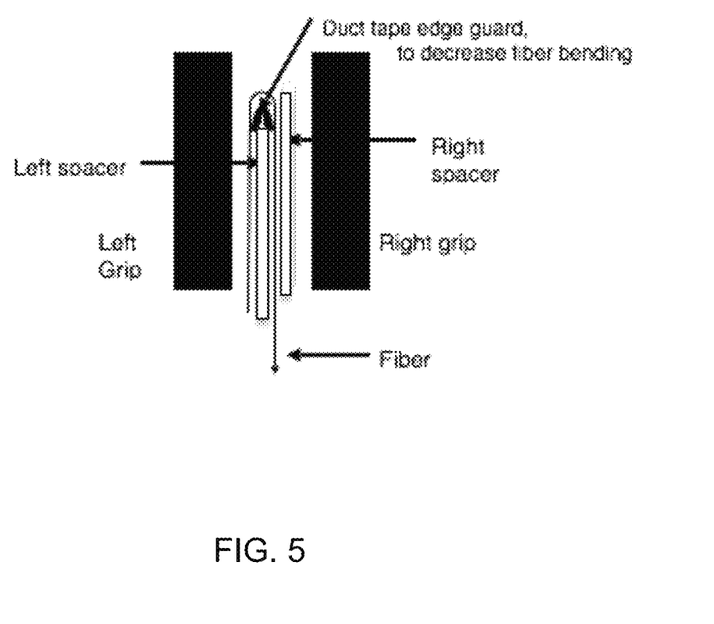
FIG. 5 is an illustration of a method used to hold a fiber for purposes of analyzing.

Tests were provided on seven different fiber materials, specifications of each fiber material can be seen in Table 1 and photos of the fibers are shown in FIG. 4. All seven fibers were used in the single fiber pullout tests. Only type 1 seen in FIG. 4 was used for the study of end anchoring mechanisms.

The fibers were cast in 2"×2"×2" mortar cubes. A jig was used to ensure the fibers were vertical during curing. After the mortar was set, the cubes were placed in an environmental room for further curing. The mortar mix was designed with the proportions shown in Table 2 with the procedures summarized in Table 3. After seven days, the strength of the mortar was tested and found to have strength in excess of 4000 psi.

The cubes were cured in the lab for one day, and then removed from the molds and placed in an environmental room (62 degrees Fahrenheit, 100% humidity) until the age of 7 days. Testing was conducted at the age of 7 days.

TABLE 1

Fiber Material Specifications

| Material Number | Denier | Crimp Pattern | Cross Sectional Area (mm$^2$) |
|---|---|---|---|
| 1 | 4500 | 18 | 0.709 |
| 2 | TBD | Indented | 0.482 |
| 11 | 2500 | 18 | 0.558 |
| 12 | 2500 | 6.5 | 0.455 |
| 14 | 2500 | 22 | 0.512 |
| 15 | 2500 | 6.5 | 0.483 |
| 16 | 4500 | 6.5 hi amplitude | 0.717 |

TABLE 2

Ratio

| | |
|---|---|
| Water:Cement | .42 |
| Sand:Cement | 2.33 |

TABLE 3

| Time (seconds) | Instructions |
|---|---|
| 0 | Mix concrete and water on low speed |
| 30 | Add sand |
| 90 | Stop mixing |
| 150 | Mix at medium speed |
| 240 | Mixing is complete |

Tests were performed to explore the effects of various crimping patterns on the hold of a fiber placed in a cube of mortar. The goal of the testing was to draw both comparative and overall conclusions from the results. The tests also explored end anchoring mechanisms implemented on the fibers and their effect on the overall hold of the fiber in cube of mortar.

Procedure

Figure 3:
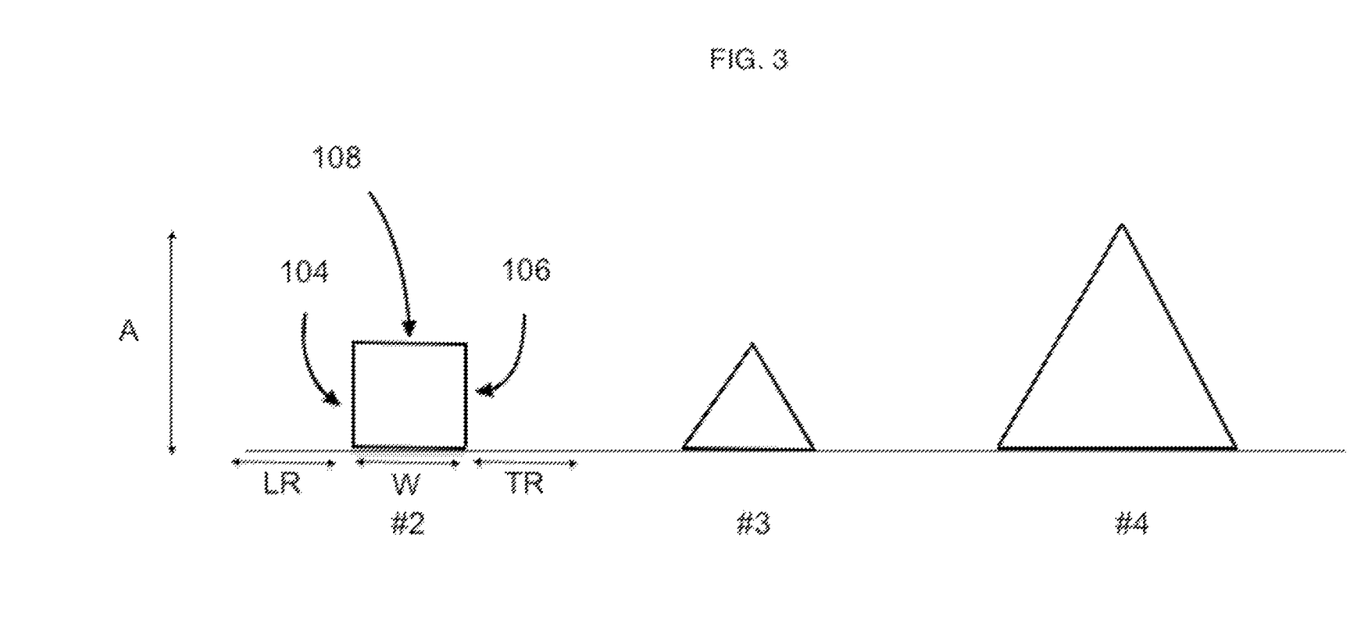
FIG. 3 illustrates comparative examples of fibers tested according to the invention.

An Instron 4502 universal test machine was used to provide consistent force and displacement data when performing the test. Each fiber and cube was mounted in the test machine. The fibers were mounted in a manner that limited slippage using vise fixtures. The fiber was compressed in a grip that used wood spacers that were secured by the vise fixtures (FIG. 3). Two wooden spacers (3 mm thick) were used to protect the fiber from the sharp grooves of the vice and increase friction while preventing the fibers from being over compressed (FIG. 4). Preliminary tests showed that an overly tight grip led to failure of fibers within the grip zone, and the grip tightness was set appropriately during the actual tests.

Figure 6:
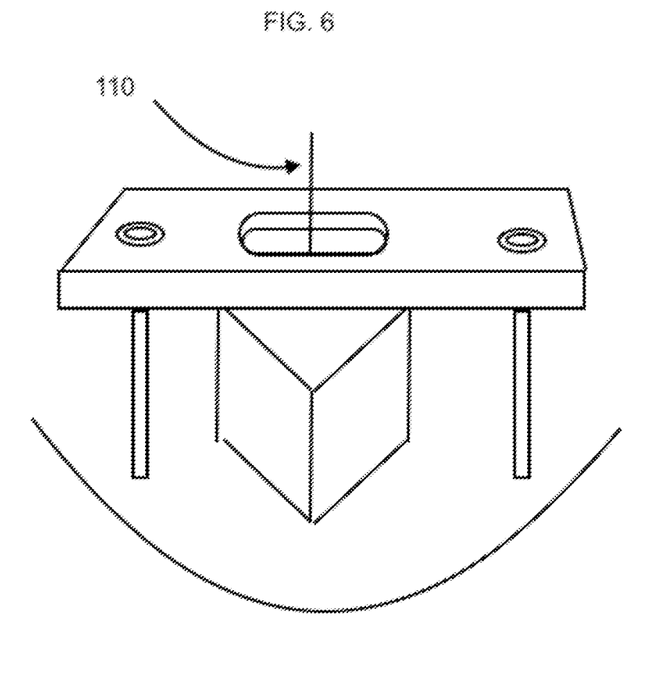
FIG. 6 is an illustration of a fiber of the invention embedded in a mortar block for purposes of analyzing.

Mortar cubes, such as seen in FIG. 6, were installed in a test machine having fiber 100 there with a free fiber end 110 extending outside the block. The free end 110 was gripped by of the test machine. This fixture ensured that the mortar cubes were secure and level.

Each fiber sample was installed with an exposed fiber length of 30 cm between the cube and a vise used to grip the fiber. The fiber 10 was manually loaded to 10 N to remove slack. Then, the test proceeded under displacement control to elongate the fiber at a rate of 20 mm/min until failure. Data collection of load and position was recorded at the rate of 1 hz.

End Anchorage Methods

An end anchorage method is a unique shape or "radical wave" created at the end of a fiber 100 to provide a mechanical hold beyond the crimp pattern of the fiber 100. There were four anchorage methods tested.

End Anchorage Example 1: Nub

Figure 7:
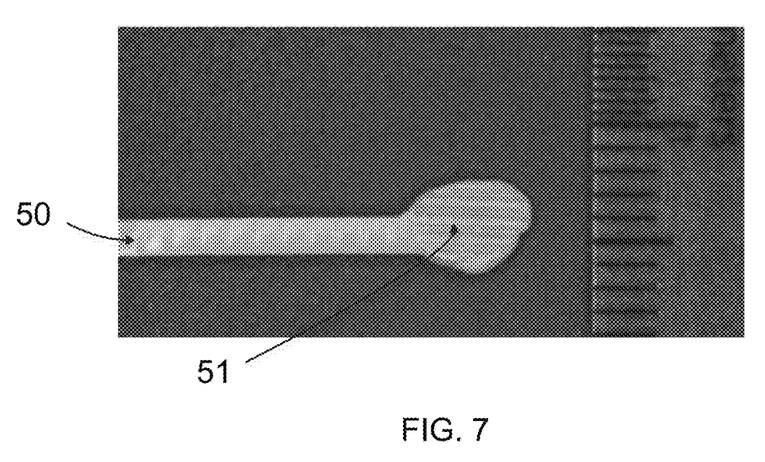
FIG. 7 shows an image of a comparative test fiber having a nob end.

This method created a nub 51 at the end of the fiber 50. This nub 51 was produced by melting the end of a normal fiber 50. When there was a small collection of molten polypropylene, the nub 51 was shaped by using pliers to compress the fiber 10 as seen in FIG. 7.

Figure 8:
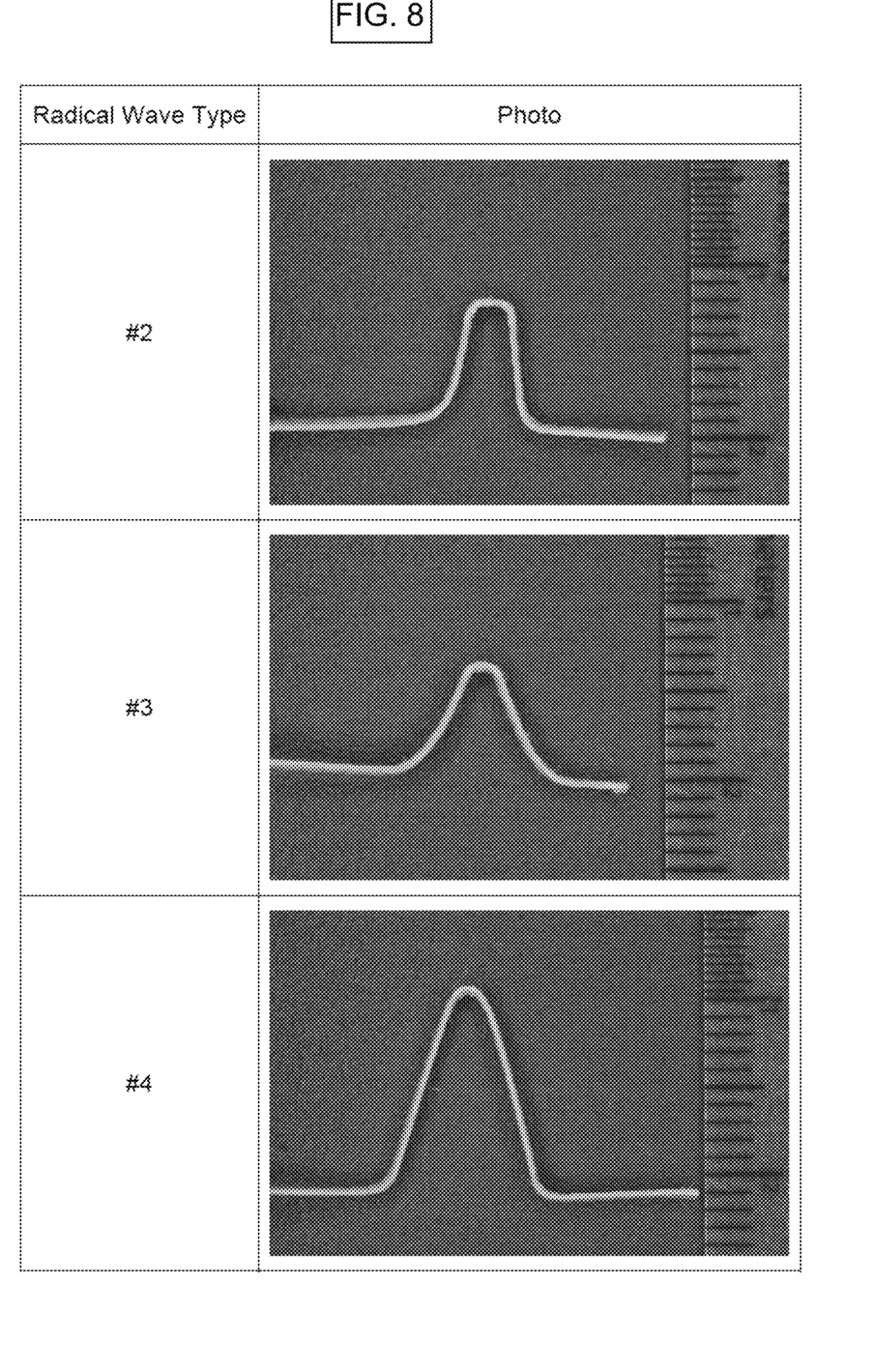
FIG. 8 shows fibers tested in accordance with those in FIG. 3.

Other end anchorage methods employed examples 2, 3, and 4 are all founded in the idea of creating a large disparity (wave 102) at the end of the fiber 100. A radical wave is a relatively large feature that is superimposed over a normal crimp pattern of the fiber 100. The end anchorage methods employ examples 2, 3, and 4 which are all radical waves, each method consists of a different radical wave shape, generally represented as shown in FIG. 8 (wherein radical ave of end anchorage in examples 2, 3 and 4 are shown in a scale of centimeters. The observed breakage is as follows:

Splayed Fiber

The fiber 100 is pulled out of the mortar cube with great damage to the fiber end 110. The fibrils within the fiber 100 are splayed and separated during the failure. The splaying can be isolated at the fiber end 110 or it may be observed along the full exposed length of the fiber 100, from block to grip.

Break at Nub

End anchorage example 1 involves melting the fiber 50 to create a nub 51 at the fiber end. The fiber 50 has a tendency to break at the end nub 51. The melting evidently weakens the fiber 50 and creates a vulnerability to failure.

Cut Fiber

In anchorage examples 2, 3, and 4, there is a point at the apex 108 of the curve in the fiber 100 where the mortar binds the fiber 100 and may create a cutting edge that fails the fiber 100 when the tensile load becomes high. This was the most common failure mechanisms observed for anchorage examples 3 and 4 due to the small run width at the apex of the wave 102. In anchorage example 2, there is a wider run width, of about 0.2-0.3 cm at the apex, creating a square wave shape and the mortar is noted less likely to create a sharp edge.

Results
Single Fiber Pull Out Results

Three replicates were tested for each fiber material. Each fiber had an implanted depth of 20 millimeters into the cube of mortar. The average results can be seen in Table 4.

TABLE 4

Average Results for Single Fiber Pull Out Tests

| Fiber Material | Load at Failure (N) | Cross Sectional Area (mm²) | Fiber Tensile Stress at Failure (ksi) | Mode of Failure |
|---|---|---|---|---|
| 1 | 156 | 0.709 | 31.9 | Clean pullout |
| 2 | 96.7 | 0.482 | 29.1 | Clean pullout |
| 11 | 120.3 | 0.558 | 31.3 | Clean pullout |
| 12 | 110.7 | 0.455 | 35.3 | Clean pullout |
| 14 | 148.3 | 0.512 | 42 | Splayed fiber |
| 15 | 90.7 | 0.483 | 27.2 | Clean pullout |
| 16 | 200.7 | 0.717 | 40.6 | Splayed fiber |

End Anchorage Results

Three replicates were tested for each end anchorage method. All tests used fiber material 1. The result of fiber material 1 from the single fiber pull out test without end anchorage is included as reference value in Table 5.

TABLE 5

Average Results for End Anchorage Method Tests

| End Anchorage Method | Load at Failure (N) | Cross Sectional Area (mm²) | Fiber Tensile Strength at Failure (ksi) | Mode of Failure |
|---|---|---|---|---|
| Reference: Fiber 1 w/o end anchorage | 156 | 0.709 | 31.9 | Clean pullout |
| 1 | 158.3 | 0.675 | 34 | Break at Nub |
| 2 | 266.7 | 0.661 | 58.5 | Splayed fiber |
| 3 | 229.7 | 0.677 | 49.2 | Clean pullout |
| 4 | 252.3 | 0.712 | 51.4 | Cut fiber |

CONCLUSIONS

1. Fiber types 1, 14 and 16 developed highest pullout load. Taking the cross-sectional area into account, fiber types 14 and 16 developed the highest tensile stress at failure, suggesting that these crimp patterns are the best performers in simple pullout tests.
2. The best performance was associated with crimp patterns with large amplitude and "kinky" rather than "smooth wave" texture. These shape characteristics contribute to secure bond of the fiber in mortar.
3. The end anchorage tests were very encouraging with pullout loads much greater than for fibers without the end anchorage.
4. The nubs created by melting the end of fibers led to breakage at the nub, suggesting this option may not be attractive.
5. All the "radical wave" fibers showed excellent performance. Pullout loads with "radical wave" designs were more than 50% greater than fibers without wave example end anchorage. End anchorage example 2 performed the best out of the "radical wave" designs.

Single Fiber Pull Out Test Results

| Code | Width (mm) | Thickness (mm) | Cross Sectional Area (mm²) | Load at Failure (N) | Tensile Strength N/mm 2 |
|---|---|---|---|---|---|
| SF-20-0101 | 1.5 | 0.45 | 0.675 | 184 | 272.5925926 |
| SF-20-0102 | 1.62 | 0.45 | 0.729 | 151 | 207.133059 |
| SF-20-0103 | 1.57 | 0.46 | 0.7222 | 133 | 184.1595126 |
| SF-20-0201 | 1.09 | 0.45 | 0.4905 | 116 | 236.4933741 |
| SF-20-0202 | 1.09 | 0.4 | 0.436 | 87 | 199.5412844 |
| SF-20-0203 | 1.06 | 0.49 | 0.5194 | 87 | 167.5009626 |
| SF-20-1101 | 1.61 | 0.34 | 0.5474 | 91 | 166.2404092 |
| SF-20-1102 | 1.53 | 0.3 | 0.459 | 114 | 248.3660131 |
| SF-20-1103 | 1.63 | 0.41 | 0.6683 | 156 | 233.4281012 |
| SF-20-1201 | 1.42 | 0.34 | 0.4828 | 136 | 281.6901408 |
| SF-20-1202 | 1.16 | 0.29 | 0.3364 | 93 | 276.4565993 |
| SF-20-1203 | 1.44 | 0.38 | 0.5472 | 103 | 188.2309942 |
| SF-20-1401 | 1.41 | 0.34 | 0.4794 | 148 | 308.7192324 |
| SF-20-1402 | 1.35 | 0.32 | 0.432 | 111 | 256.9444444 |
| SF-20-1403 | 1.6 | 0.39 | 0.624 | 186 | 298.0769231 |
| SF-20-1501 | 1.28 | 0.32 | 0.4096 | 116 | 283.203125 |
| SF-20-1502 | 1.54 | 0.37 | 0.5698 | 63 | 110.5651106 |
| SF-20-1503 | 1.34 | 0.35 | 0.469 | 93 | 198.2942431 |
| SF-20-1601 | 1.82 | 0.47 | 0.8554 | 207 | 241.9920505 |
| SF-20-1602 | 1.63 | 0.42 | 0.6846 | 190 | 277.5343266 |
| SF-20-1603 | 1.53 | 0.4 | 0.612 | 205 | 334.9673203 |

End Anchorage Examples

| Code | Width (mm) | Thickness (mm) | Cross Sectional Area (mm²) | Load at Failure (N) | Tensile Strength N/mm 2 |
|---|---|---|---|---|---|
| EA01-20-0101 | 1.49 | 0.44 | 0.6556 | 147 | 224.2220866 |
| EA01-20-0102 | 1.59 | 0.44 | 0.6996 | 109 | 155.8033162 |
| EA01-20-0103 | 1.52 | 0.44 | 0.6688 | 219 | 327.4521531 |
| EA02-20-0101 | 1.57 | 0.45 | 0.7065 | 290 | 410.4741684 |
| EA02-20-0102 | 1.51 | 0.42 | 0.6342 | 254 | 400.5045727 |
| EA02-20-0103 | 1.46 | 0.44 | 0.6424 | 256 | 398.505604 |
| EA03-20-0101 | 1.53 | 0.45 | 0.6885 | 230 | 334.0595497 |
| EA03-20-0102 | 1.56 | 0.42 | 0.6552 | 245 | 373.9316239 |
| EA03-20-0103 | 1.53 | 0.45 | 0.6885 | 214 | 310.8206245 |
| EA04-20-0101 | 1.62 | 0.48 | 0.7776 | 270 | 347.2222222 |
| EA04-20-0102 | 1.45 | 0.41 | 0.5945 | 235 | 395.2901598 |
| EA04-20-0103 | 1.66 | 0.46 | 0.7636 | 252 | 330.015715 |

Useful fibers can include thermoplastics including polyolefins, such as polyethylene and polypropylene; poly esters; polyvinyl chloride; polyvinylidene chloride; polyamides including aromatic polyamides, such as KEVLAR®; polyacrylics, and mixtures thereof. The thermoplastic fibers can be 100 percent homopolymer, they can have copolymers and polymer blends. material can be modified with coatings or filler. The material must be of a type to lend itself to addition to concrete. A fiber can be referred to by its polymeric name e.g., polypropylene, if it is at least primarily polypropylene rather than comprising 100 percent polypropylene. In other words, selection of the thermoplastic polymer does not constitute a limitation of the present invention. Practical considerations for fiber selection include creep resistance, a strong trait of polyesters, and dispersibility of the fiber in the concrete mixture, although the absence of either one of these properties should not eliminate a particular polymer invention.

In addition to the radical wave described herein, the fiber 100 can includes a plurality of conventional smaller crimps, such as a small sinusoidal configuration in addition the radical wave 102. The value of the fiber 100 as an additive to reinforce concrete is in the increased force and energy expended to pull the bonded fiber from the concrete which is limited by the ultimate tensile strength (UTS) of the fiber 100 where failure occurs and it can no longer resist the separation between previously continuous sections of concrete.

The invention is not limited to the materials which have been mentioned, nor to the forms of fiber which have been shown, so it is possible to obtain wire elements of the same form with other fibers. Those skilled in the art can vary the material and amount of the fiber 100 for particular use. While the invention has been described and illustrated with respect to certain preferred examples which give satisfactory results, it will be understood by those skilled in the art after understanding the principle of the invention, that various changes and modifications may be made without departing from the spirit of the invention.

What is claimed is:

1. A reinforcing fiber, which includes:
   a polymer fiber having a first radical wave therein, wherein said first radical wave includes an amplitude of between about 0.5 to 1 cm and a wave run width of about 0.05 to about 0.3 cm, and a leading run and trailing run of at least about 0.75 cm, wherein said wave includes a leading edge and a trailing edge which are normal to said leading run and said trailing run and form part of square wave.

2. The reinforcing fiber of claim 1, wherein said polymer fiber cross-sectional width can be between 0.2 to 0.3 cm. and a linear density between about 2500 to 4500 Denier.

3. The reinforcing fiber of claim 1, having a second radical wave therein, wherein said second radical wave includes an amplitude of between about 0.5 to 1 cm and a wave run width of about 0.05 to about 0.3 cm, and a leading run and trailing run of at least about 0.75 cm, wherein said leading run of said first radical wave interconnects said trailing run of said second radical wave.

4. The reinforcing fiber of claim 3, wherein at least of said leading run of said second radical wave and said trailing run of said first radical wave are separated by about 1.5 cm.

5. A reinforced material, which includes:
   a concrete material,
   a plurality of polymer fibers substantially uniformly distributed and randomly oriented in said concrete material, each said polymer fiber having a first radical wave therein, wherein said first radical wave includes an amplitude of between about 0.5 to 1 cm and a wave run width of about 0.05 to about 0.3 cm, and a leading run and trailing run of at least about 0.75 cm, wherein said wave includes a leading edge and a trailing edge which are normal to said leading run and said trailing run and form part of square wave.

6. The reinforced material of claim 5, wherein said polymer fiber cross-sectional width can be between 0.2 to 0.3 cm. and a linear density between about 2500 to 4500 Denier.

7. The reinforced material of claim 5, having a second radical wave therein, wherein said second radical wave includes an amplitude of between about 0.5 to 1 cm and a wave run width of about 0.05 to about 0.3 cm, and a leading run and trailing run of at least about 0.75 cm, wherein said leading run of said first radical wave interconnects said trailing run of said second radical wave.

8. The reinforced material of claim 7, wherein at least of said leading run of said second radical wave and said trailing run of said first radical wave are separated by about 1.5 cm.

\* \* \* \* \*